United States Patent
Hsieh et al.

(10) Patent No.: US 11,675,744 B2
(45) Date of Patent: Jun. 13, 2023

(54) PERFORMING A CODE CONVERSION IN A SMALLER TARGET ENCODING SPACE

(71) Applicant: International Business Machines Corporation, Armonk, NY (US)

(72) Inventors: Albert Hsieh, Taipei (TW); Elaine I H. Liao, Taipei (TW); Chih-Yuan Lin, Taipei (TW); Pei-Yi Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 16/656,884

(22) Filed: Oct. 18, 2019

(65) Prior Publication Data
US 2020/0050589 A1 Feb. 13, 2020

Related U.S. Application Data

(63) Continuation of application No. 15/451,755, filed on Mar. 7, 2017, now Pat. No. 10,545,924, which is a
(Continued)

(30) Foreign Application Priority Data

Mar. 30, 2012 (TW) .................. 101111653

(51) Int. Cl.
*G06F 16/00* (2019.01)
*G06F 16/178* (2019.01)
*G06F 40/129* (2020.01)

(52) U.S. Cl.
CPC ........ *G06F 16/1794* (2019.01); *G06F 40/129* (2020.01)

(58) Field of Classification Search
CPC .......................... G06F 16/1794; G06F 40/129
See application file for complete search history.

(56) References Cited

U.S. PATENT DOCUMENTS

| 5,389,924 A | 2/1995 | Ogawa |
| 5,963,155 A | 10/1999 | Cheng et al. |

(Continued)

FOREIGN PATENT DOCUMENTS

| CN | 1741006 A | 3/2006 |
| CN | 1971587 A | 5/2007 |

(Continued)

*Primary Examiner* — Paul Kim
(74) *Attorney, Agent, or Firm* — Cantor Colburn LLP; Brian Rakesh

(57) ABSTRACT

Embodiments relate to a system, method and program product for performing code conversions. In one embodiment the method includes determining size of encoding space for a source file and a target file upon receipt of a code conversion request and generating a main conversion file upon determination that a target encoding space associated with said target file is smaller than a source encoding space associated with the source file. Subsequently an extension converted file is generated from the source file according to a pre-established mapping table of code conversion stored in a memory. The code conversion request is completed by using the main conversion file and said extension file together so that the source file does not need to be truncated in order to fit into the target conversion space.

18 Claims, 5 Drawing Sheets

Related U.S. Application Data continuation of application No. 13/851,289, filed on Mar. 27, 2013, now Pat. No. 9,684,654.

(56) References Cited

U.S. PATENT DOCUMENTS

| | | | |
|---|---|---|---|
| 6,185,729 B1 * | 2/2001 | Watanabe | G06F 9/454 |
| | | | 717/100 |
| 6,204,782 B1 | 3/2001 | Gonzalez et al. | |
| 6,522,330 B2 | 2/2003 | Kobayashi | |
| 6,698,014 B1 | 2/2004 | Rechter | |
| 6,701,320 B1 * | 3/2004 | Marple | G06F 40/126 |
| | | | 707/758 |
| 7,051,278 B1 * | 5/2006 | Ehrman | G06F 40/129 |
| | | | 715/264 |
| 7,218,252 B2 | 5/2007 | Fauque | |
| 7,299,452 B1 * | 11/2007 | Zhang | G06F 40/129 |
| | | | 717/124 |
| 7,353,163 B2 | 4/2008 | Rawsthorne et al. | |
| 7,409,680 B2 | 8/2008 | Souloglou et al. | |
| 7,900,143 B2 | 3/2011 | Xu | |
| 9,684,654 B2 | 6/2017 | Hsieh et al. | |
| 2003/0182103 A1 | 9/2003 | Atkin | |
| 2006/0173931 A1 | 8/2006 | Broadhurst | |
| 2009/0164455 A1 | 6/2009 | Weinberg | |
| 2017/0242850 A1 | 8/2017 | Hsieh et al. | |

FOREIGN PATENT DOCUMENTS

| | | |
|---|---|---|
| CN | 101243441 A | 8/2008 |
| CN | 101404007 A | 4/2009 |

* cited by examiner

PERFORMING A CODE CONVERSION IN A SMALLER TARGET ENCODING SPACE

PRIORITY

This application is a continuation of U.S. patent application Ser. No. 15/451,755, filed Mar. 7, 2017 which is a continuation of U.S. patent application Ser. No. 13/851,289, filed Mar. 27, 2013 now U.S. Pat. No. 9,684,654, which claims priority to Taiwan Patent Application 101111653, filed on Mar. 30, 2012 and all benefits accruing therefrom under U.S.C. § 119, the contents of which are incorporated herein by reference in their entirety.

BACKGROUND

The present invention generally relates to code conversion, and more particularly to code conversion in a small target encoding space.

Many computers or other electronic devices, employ text as a means to interact with a user. These texts are generally displayed on a monitor or other types of display screens. The text is generally presented after using the internal digital representation of a computer or other such electronic device. This means that the characters must be encoded at some point and correlated to a character set. This concept, hereinafter referred to as "the character set encoding", is used to correspond each character in the character set with a unique digital representation. The encoded character can be a letter, a figure or other types of text symbols. Each character is assigned a digit code which is then to be used by a computer or another electronic device. Computer systems in different languages use different character sets. For example, in Chinese, the computer may use a "BIG5" or alternatively a "Unicode" character set.

A problem occurs, however, when using EBCDIC in conjunction with some of these character sets. For example, in Chinese when a Coded Character Set Identifier (CCSID) is used, the digit "00835" used for EBCDIC also indicates a code page related to traditional Chinese in double bytes. The problem often occurs when dealing with a code page or character conversion. One reason for this problem occurring is because the (smaller) code page area is limited in the expansion of code points. Therefore, when conversion of characters occurs from a larger code page, a concatenation takes place. For example, a comparison between Unicode and EBCDIC (CCSID=00835) shows that the code point range of EBCDIC code page is smaller than that of Unicode. Therefore, in such cases, when a source's encoding space (such as Unicode) is larger than a target encoding space (such as EBCDIC), all available code points in the code table for the target encoding space will be exhausted.

BRIEF SUMMARY

Embodiments relate to a method and program product for performing code conversions. In one embodiment the method includes determining size of encoding space for a source file and a target file upon receipt of a code conversion request and generating a main conversion file upon determination that a target encoding space associated with said target file is smaller than a source encoding space associated with the source file. Subsequently an extension converted file is generated from the source file according to a pre-established mapping table of code conversion stored in a memory. The code conversion request is completed by using the main conversion file and said extension file together so that the source file does not need to be truncated in order to fit into the target conversion space.

In an alternate embodiment a system for performing a code conversion having a computer host is provided. The system includes a bus system and a memory connected to the bus system. The memory includes a set of stored instructions. A processing unit is also connected to the bus system. The processing unit determines the size of the encoding space for a source file and a target file upon receipt of a code conversion request. The processing unit also generates a main conversion file upon determination that a target encoding space associated with the target file is smaller than a source encoding space associated with the source file. The processing unit generates an extension converted file from the source file according to a pre-established mapping table of code conversion stored in the memory and associated with the stored instruction. In addition, the processing unit completing said code conversion request by using said main conversion file and the extension file together, so that said source file does not need to be truncated in order to fit into the target conversion space.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
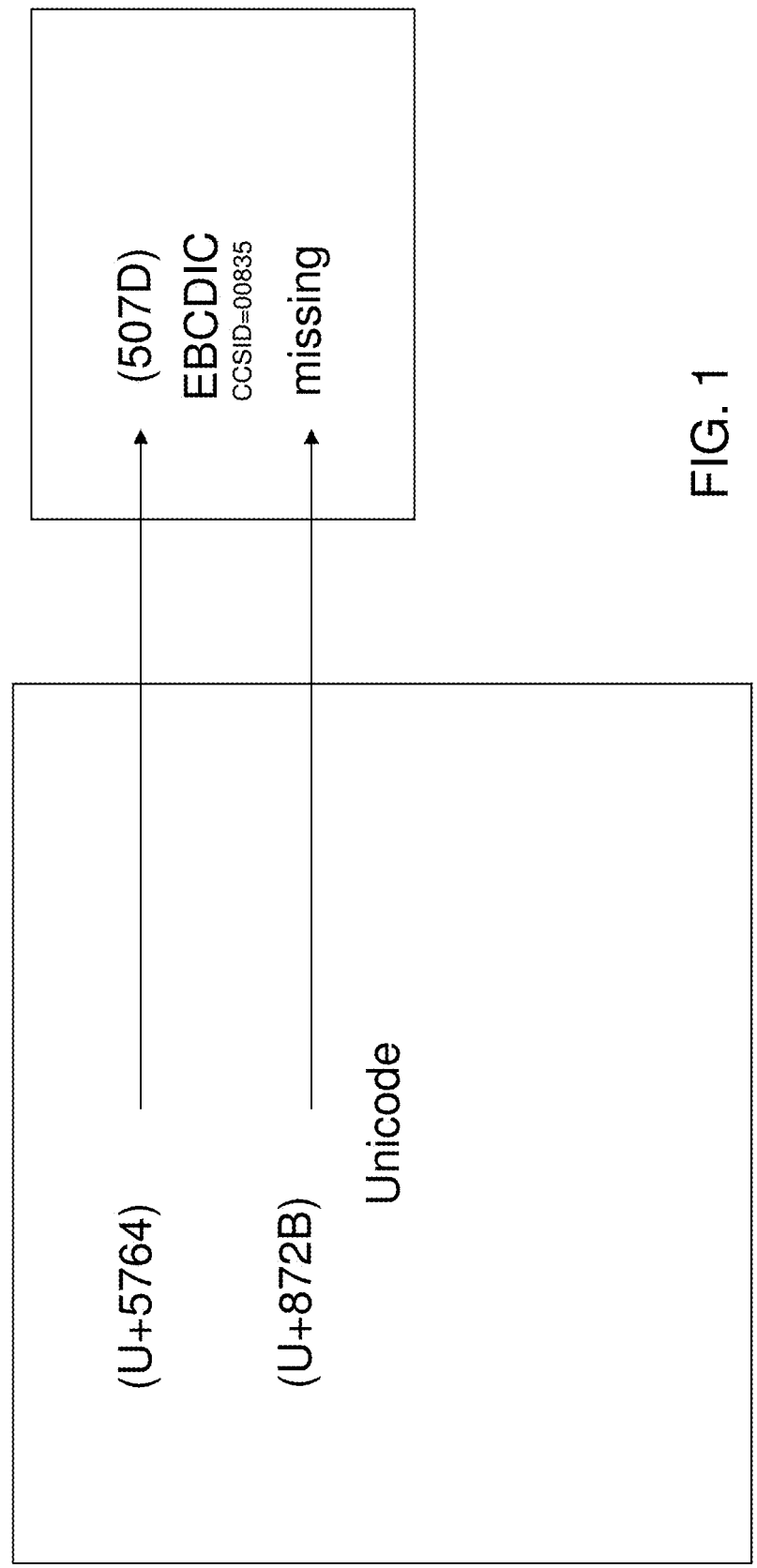
FIG. 1 is an illustration depicting an example for performing the code conversion between Unicode and EBCDIC with unmatched target area sizes.

FIG. 1 provides an illustration of one example where the difference between a smaller and a larger area can provide a problem in converting characters. As shown in FIG. 1, the code point "坤" (U+5764) in the source encoding space, such as Unicode, has a corresponding code point "坤" (507D) in the target encoding space (EBCDIC, CCSID=00835). Nevertheless, the code point "蜫" (U+872B) in Unicode does not have a corresponding code point in EBCDIC.

Generally, the original code points in Unicode without the corresponding code points in EBCDIC are sometimes referred to as "the rare" words in the language. The conventional solution is to map these rare words to a pre-defined specific character in the target encoding space or alternatively to reserve the original codes of the rare words (i.e. the code points in the source encoding space) from the source encoding space to be converted in the target encoded text after conversion. However, the latter is always not readable in the target encoded text after conversion. In addition, for the conversion between a 4-bytes Unicode (UCS-4) and a 2-bytes EBCDIC (CCSID=00835), EBCDIC (CCSID=00835) only used 2 bytes are provided while the Unicode (UCS-4) uses 4 bytes. This creates the same initial truncation issue as certain required bytes are not available in such a scenario. In addition, the specific characters may be identified in the target encoding space or under a code page, but the language features for the rare words will all be lost. Referring back to the example used, in Chinese, the language features may be pronunciation (pinyin), radical, number of strokes, stroke order, glyph and the like that leave the solution with loopholes.

These issues that are not addressed in the prior art require a technique that can provide for a target encoding space which may read the rare words and can also reserve the language features of the rare words as appropriate.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, these described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides a novel code conversion mechanism. The mechanism employs a pre-established mapping table of code conversion and generates respectively a main converted file and an extension converted file encoded with the smaller target encoding space to be used by an application program from a source file encoded with the source encoding space. The mapping table is established based on the language features, and its mechanism employs some specific language features to group some rare words in the source encoding space for sharing the same single code point having the identical or similar specific language features in the target encoding space.

While performing the conversion of data file, the main converted file is established with a pre-established mapping table of code conversion according to the conventional method, and the extension converted file records the extension code of the rare word also according to the mapping table, so as to distinguish different characters from the source encoding space sharing the same single code point in the target encoding space. Therefore, by combining the main converted file with the extension converted file, the present invention extends the code area of the target encoding space to be used by the program using the target encoding space.

For the conventional application program only accepting the original target encoding space, a deputy character sharing the same single code point in the target encoding space and having the identical or similar language features may be used to represent the rare word. Because the deputy character and the rare word have the identical or similar language features, it can also help to understand and guess the content of the data file. Thus, a new program employing the established extension code area of the target encoding space combining the main converted file and the extension converted file can combine the main converted file and the extension converted file to find the correct rare word to be correctly represented.

According to an embodiment of the present invention, the present invention discloses a method for performing a code conversion in a smaller target encoding space. The method comprises the following steps: receiving a request of performing a code conversion for a source file from a source encoding space to a target encoding space which is smaller than the source encoding space, wherein the source file is encoded based on the source encoding space; and generating respectively a main converted file and an extension converted file from the source file according to a pre-established mapping table of code conversion.

According to another embodiment of the present invention, the present invention discloses a computer system for performing a code conversion in a smaller target encoding space, which includes a host. The host further comprises a bus system; a memory connected with the bus system, wherein the memory includes a set of instructions; a processing unit connected with the bus system, wherein the processing unit executes the set of instructions to perform the method for aforesaid code conversion.

According to another embodiment of the present invention, the present invention discloses the computer system for performing a code conversion in a smaller target encoding space with a computer program product stored on a computer-usable medium, which comprises a computer-readable program for performing the method for code conversion while running on a computer.

Referring now to FIG. 2 through FIG. 5, computer devices, methods, and computer program products are illustrated as structural or functional block diagrams or process flowcharts according to various embodiments of the present invention. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
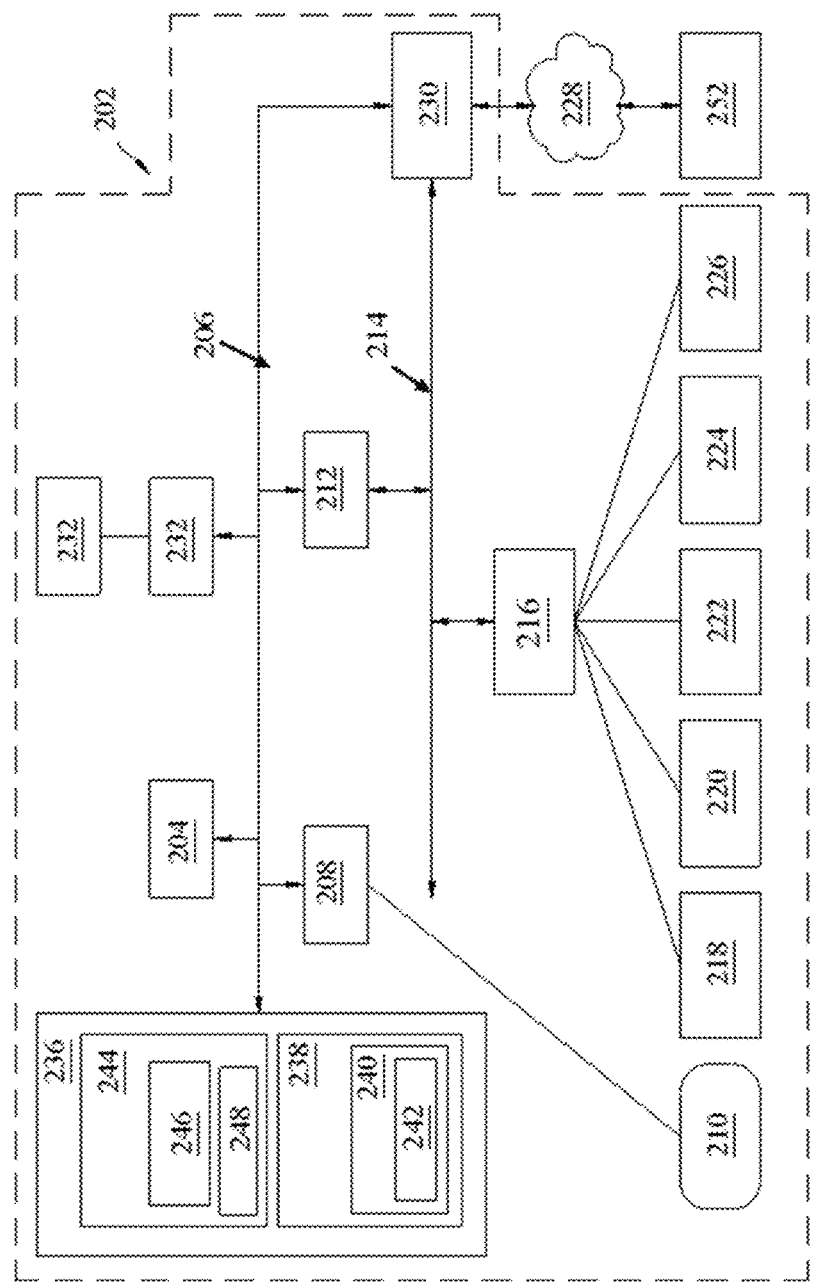
FIG. 2 is an illustration hardware environment block diagram of an illustrative computer system according to one embodiment.

In addition, in one embodiment, a computer system is provided and can be discussed in conjunction with FIG. 2. FIG. 2 is a block diagram of an illustrative hardware environment of a computer device 202 according to the present invention. In an exemplary embodiment, the computer device 202 is a universal desktop computer comprising: a processor for executing various applications; a storage device for storing various information and program code; a display device, a communication device, and an input/output device which function as interfaces for communicating with a user; and a peripheral component or other components serving a specific purpose. In another embodiment, the present invention is implemented in another way and thus having less or more other devices or components. The network can also be implemented in any form of a connection, including a fixed connection, such as a local area network (LAN) or a wide area network (WAN), or getting connected to the Internet through a dial-up connection provided by an Internet service provider (ISP). The network connection is not restricted to cable connection and wireless connection; instead, it can also be implemented by wireless connection in the form of a GSM connection or a Wi-Fi connection for communicating with a client computer. The network further comprises other hardware and software components (not shown), such as an additional computer system, router, and firewall.

As shown in FIG. 2, the computer device 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) 222, a floppy disk drive 224, and a flash drive memory 226. The format of the ports connected to I/O interface 216 may be any known to those skilled in the art of computer architecture, including but not limited to Universal Serial Bus (USB) ports.

The computer device 202 is able to communicate with a server 252 via a network 228 using a network interface 230, which is coupled to system bus 206. Network 228 may be an external network such as the Internet, or an internal network such as an Ethernet or a Virtual Private Network (VPN). Using network 228, the computer device 202 is able to access the server 252. A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes client computer device 202's operating system (OS) 238 and application programs 244.

In one embodiment, the operating system 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc. As depicted, OS 238 also includes kernel 242, which includes lower levels of functionality for OS 238, including providing essential services required by other parts of OS 238 and application programs 244, including memory management, process and task management, disk management, and mouse and keyboard management.

The hardware framework of a server 252 is identical or similar to that of the client computer device 202, or is any conventional basic framework, and the present invention is not limited thereto. For example, the server is a desktop computer, a notebook computer, a personal digital assistant (PDA), or a smartphone. However, FIG. 2 and the above examples are not restrictive of the present invention. The server 252 comprises a browser. The browser comprises a program module and instructions. The program module and commands comply with the Hypertext Transfer Protocol (HTTP) whereby a World Wide Web (WWW) client (i.e., the client computer device 202) sends and receives web-based messages through the Internet.

The application program 244 may include a code conversion module 246 and a mapping table 248 of code conversion according to the present invention. The code conversion module 246 include program modules and instructions, in which these program modules and instructions can perform the code conversion for a source file to obtain a converted target file. The code conversion module 246 is a module in the application or is implemented in the form of a daemon. In another embodiment, the code conversion module 246 is implemented as a program in another form.

The hardware elements depicted in the computer device 202 are not intended to be exhaustive, but rather are representative to highlight essential components required by the present invention. For instance, client computer 202 may include alternate memory storage devices such as magnetic cassettes, Digital Versatile Disks (DVDs), Bernoulli cartridges, and the like. These and other variations are intended to be within the spirit and scope of the present invention.

Figure 3:
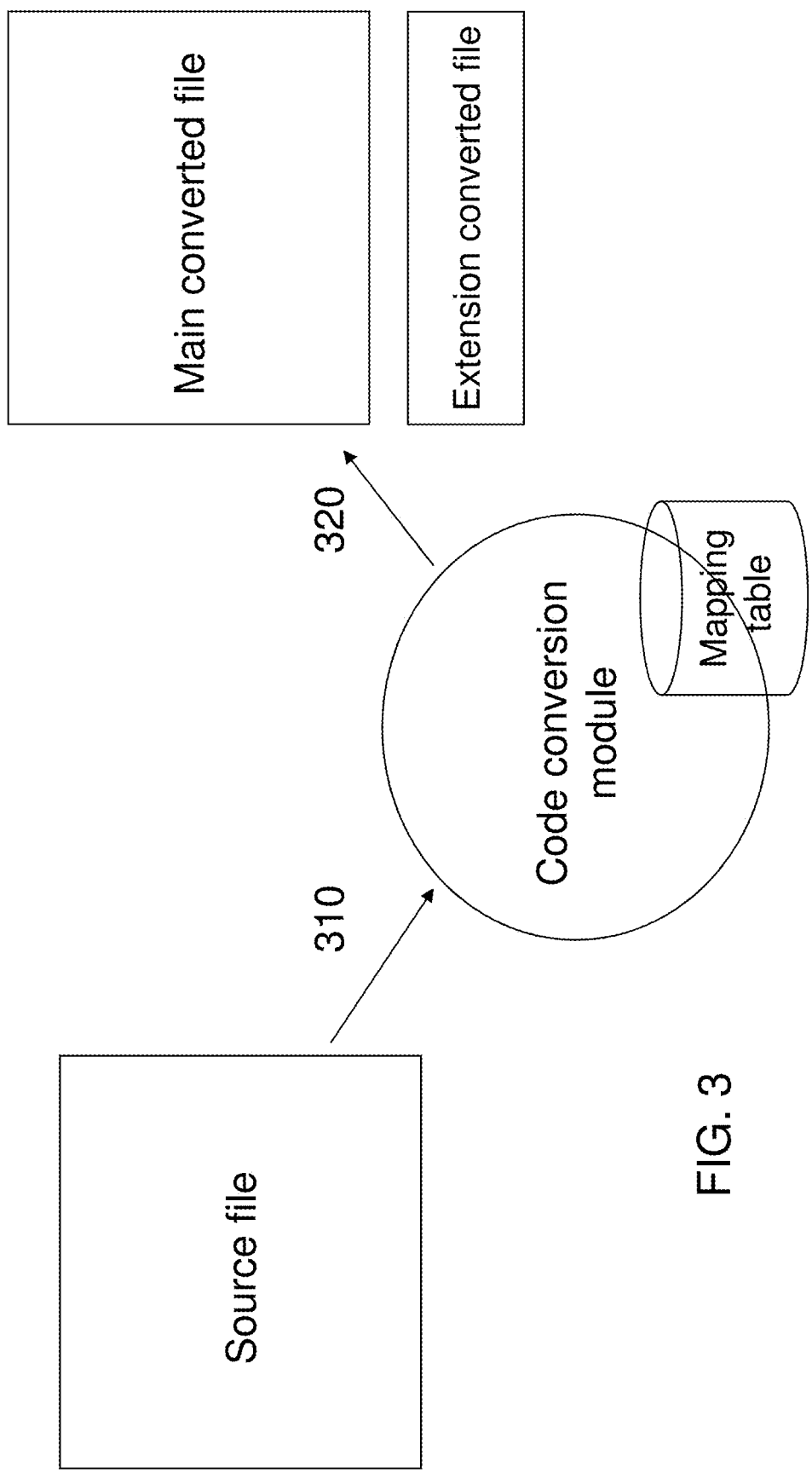
FIG. 3 is an illustration of a flowchart for a code conversion module according to one embodiment.

FIG. 3 provides one embodiment where a process code conversion module is used. FIG. 3 in connection with FIG. 4 and FIG. 5 also illustrate the method steps of the code conversion module according to the present invention. FIG. 3 is a method flowchart for the code conversion module of an embodiment according to the present invention. Step 310: receiving a request of performing a code conversion for a source file, wherein the source file is encoded by a source encoding space. Step 320: generating respectively a main converted file and an extension converted file from the source file according to a pre-established mapping table 248 of code conversion, wherein the source encoding space, such as Unicode, is larger than the target encoding space, such as EBCDIC. The mapping table 248 is established based on the language features, and its mechanism employs some specific language features to group some rare words in the source encoding space for sharing the same single code point having the identical or similar specific language features in the target encoding space. More details will be described hereinafter by referring to FIG. 4 or 5. The main converted file is established with a pre-established mapping table 248 of code conversion according to the conventional method. The extension converted file records the extension code of the rare word also according to the mapping table 248 to distinguish different characters from the source encoding space sharing the same single code point in the target encoding space.

Figure 4:
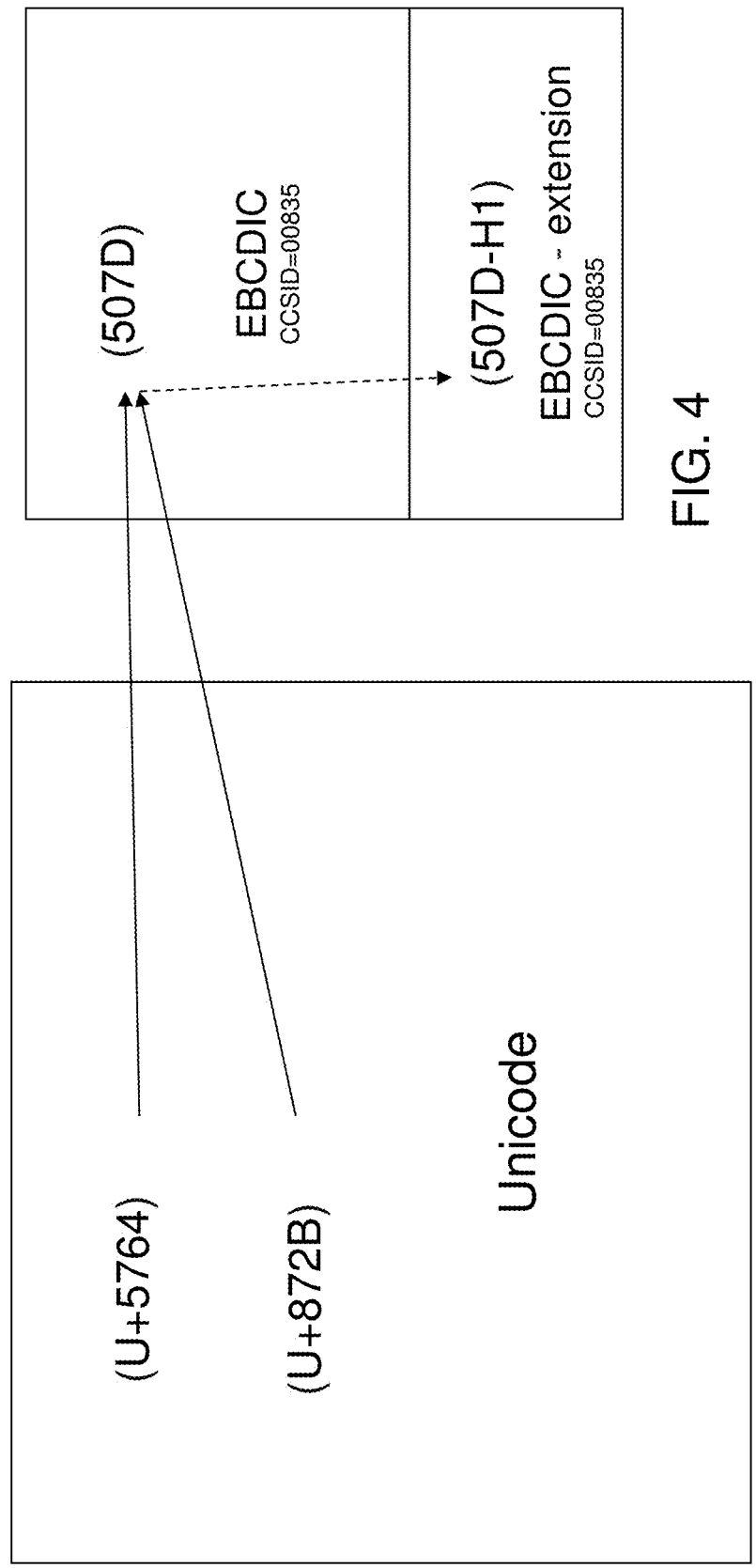
FIG. 4 is an illustration depicting establishing a mapping table for code conversion according to one embodiment.

FIG. 4 illustrates an embodiment for establishing a mapping table 248 of code conversion according to the present invention. As shown in FIG. 1, the code point "坤" (U+5764) in the source encoding space, such as Unicode, has a corresponding code point "坤" (507D) in the target encoding space (EBCDIC, CCSID=00835). Nevertheless, the code point "蜫" (U+872B) in Unicode does not have a corresponding code point in EBCDIC. According to the example in FIG. 4 of the present invention, firstly, the code point in Unicode without a corresponding code point in EBCDIC is mapped to a code point representing a deputy character in EBCDIC. The deputy character has the identical or similar language feature of pronunciation with the rare word. As shown in FIG. 4, the code point "坤" (U+5764) in Unicode has a corresponding code point "坤" (507D) in EBCDIC (CCSID=00835). And, the code point "蜫" (U+872B) as a rare word in Unicode having the identical language feature of pronunciation is also mapped to the corresponding code point "坤" (507D) of "坤" (U+5764) in EBCDIC. Therefore, the rare words having the same pronunciation may be classified as the same group for sharing the deputy character represented with the same code point in EBCDIC.

An extension code is used to identify the rare words having the identical or similar language feature of pronunciation and sharing the same single code point in the target encoding space. As shown in FIG. 4, the code point "蜫" (U+872B) as a rare word in Unicode having the identical language feature of pronunciation is also mapped to the corresponding point "坤" (507D) of "坤" (U+5764) in EBCDIC, but is additionally recorded an extension code (H1) using the identical language feature of pronunciation. The generation of extension code (H1) may be simply encoded in sequence, such as the example in FIG. 4 of the present invention which simply assigns H1=01. Therefore, combining the main converted file with the extension converted file, the present invention extends the code area of the target encoding space to be used by the program using the target encoding space.

The example in FIG. 4 only employs a single language feature of pronunciation as the basis for rare words grouping. In fact, the deputy character may have at least one identical or similar language features with the rare word. Making an example with Chinese, the language features may be pronunciation (pinyin), radical, number of strokes, stroke order, glyph and the like. Therefore, the rare words having the identical one or more language features may be classified as the same group for sharing the same single code point in EBCDIC, i.e. sharing the deputy character represented by the same single code point. At this time, the establishment of the extension code may use the conventional hash function having different language features as the input to assign a unique value for each of a plurality of characters sharing the same code point as the extension code. For example, if the values for radical and number of strokes are integers between [0, 255], the hash function below will generate a unique value for the combination of specific radical and number of strokes.

$$F(radical, number\ of\ strokes) = Hex((radical)*256 + (number\ of\ strokes))$$

Figure 5:
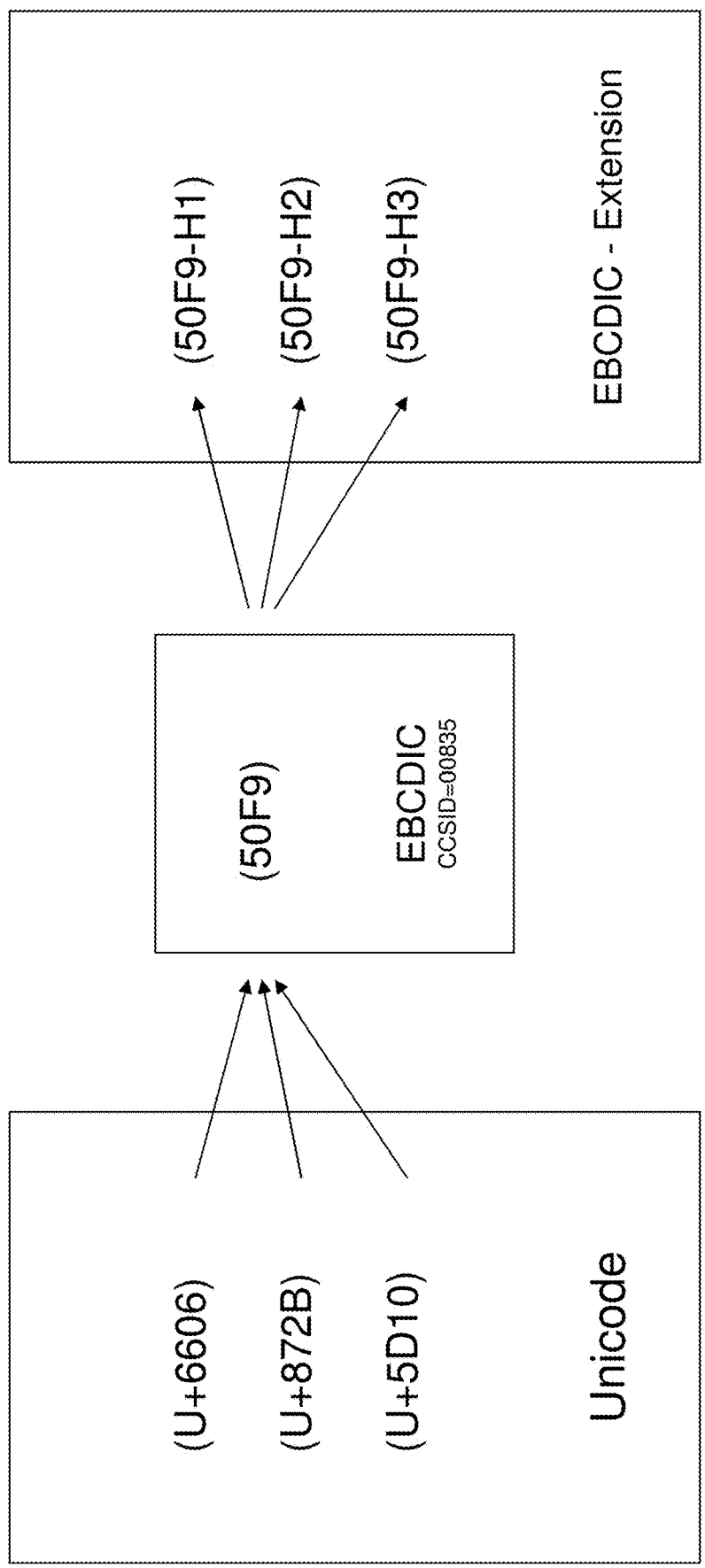
FIG. 5 is an illustration depicting code conversion according to an alternate embodiment.

The hash function is reversible, so as to reserve the language features in the extension code. FIG. 5 is a second embodiment for establishing the code conversion according to the present invention. As shown, not only the rare words having the identical or similar language feature of pronunciation and sharing the same single code point in the target encoding space are assigned with a unique extension code, but also the deputy character of the sharing code point is also assigned with an extension code. For example, the code point "昆" (U+6606) in Unicode has a corresponding code point "昆" (50F9) in EBCDIC (CCSID=00835), and the code points "蜫" (U+872B) and "崑" (U+5D10) as rare words in Unicode having the identical language feature of pronunciation are also mapped to the corresponding code point "昆" (50F9) of "昆" (U+6606) in EBCDIC, i.e. sharing the same corresponding code point "昆" (50F9) in the target encoding space. However, as shown in FIG. 5, all the characters sharing the code point are assigned with a unique extension code, H1, H2 and H3, including the corresponding code point "昆" (50F9). Similarly, as described, the generation of extension codes (H1, H2 and H3) may be simply encoded in sequence according to the embodiment of the present invention, which is to simply assign H1=01, H2=02 and H3=03 respectively.

According to the embodiment as described in FIG. 4 or FIG. 5, a mapping table 248 of code conversion may be pre-established. While performing the conversion of data file, the source file will be generated respectively a main converted file and an extension converted file according to a pre-established mapping table 248 of code conversion. The main converted file is established with a pre-established mapping table 248 of code conversion according to the conventional method, and the extension converted file records the extension code of the rare word also according to the mapping table 248, so as to distinguish different characters sharing the same single code point in the target encoding space. Therefore, by combining the main converted file with the extension converted file, the present invention extends the code area of the target encoding space to be used by the program using the target encoding space. The main converted file and an extension converted file established after performing the conversion of data file may be represented in the form as below.

Source file:

...
XYZ昆蜫崑
...

Main converted file:

...
xxxx yyyy zzzz 50F9 50F9 50F9
...

Extension converted file:

...
hhhh hhhh hhhh H1 H2 H3
...

wherein XYZ are characters in the source encoding space, and xxxx yyyy zzzz are respectively the corresponding code points of XYZ in the target encoding space. The character having a corresponding code point in the target encoding space may be represented with a particular character hhhh in the extension converted file; otherwise, filling with the corresponding extension code. It should be noted that the form of extension converted file as above is only an example, and the present invention is not limited thereto. It may also be recorded by offset, i.e. the number of words in context, such as offset aaa H1,
offset bbb H2, and
offset ccc H3 wherein aaa, bbb, ccc are respectively represented the offset of characters "昆", "琨", "崑" in the source file.

For the conventional application program only accepting the original target encoding space, a deputy character sharing the same single code point in the target encoding space and having the identical or similar language features may be used to represent the rare word. Because the deputy character and the rare word have the identical or similar language features, it can also help to understand and guess the content of the data file.

It should be described that, according to the disclosure of the present invention, because there is an extension area for expansion of corresponding characters in the original target encoding space to accommodate all the rare words in the source encoding space, so that a new program employing the present invention to combine the main converted file and the extension converted file to establish an extension code area for the target encoding space as described may combine the main converted file and the extension converted file to find the correct rare word to be correctly represented.

The foregoing preferred embodiments are provided to illustrate and disclose the technical features of the present invention and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

What is claimed is:

1. A method for performing code conversions, comprising:

receiving a request for a code conversion from a source file to a target file, wherein a target encoding space comprising Extended Binary Coded Decimal Interchange Code (EBCDIC) associated with the target file is smaller than a source encoding space comprising Unicode associated with the source file;

generating a main conversion file in response to receiving the request;

generating an extension conversion file from said source file according to a pre-established mapping table of code conversion stored in a memory, the pre-established mapping table established with language features that include at least one identical or similar language feature shared by a group of rare words that are provided in the source and target files; and completing said code conversion by using said main conversion file and said extension file such that the target conversion space does not include a truncation of said source file, wherein a rare word is a character in said source encoding space but a corresponding code for said same rare word is not provided in said target encoding space, wherein the completing comprises creating the corresponding code for the rare word by combining a code point of a deputy character in the main conversion file with an extension code of the rare word in the extension conversion file to extend the code of the target encoding space to include the rare word, and wherein the main conversion file and not the extension conversion file is used during execution of a first application program on a processor, and both the main conversion file and the extension file are used during execution of a second application program on the processor.

2. The method of claim 1, wherein the source encoding space and associated file is for a Unicode file, and said target encoding space and associated file is for a EBCDIC file.

3. The method of claim 1, wherein said deputy character has at least one identical or similar language feature with said rare word.

4. The method of claim 3, wherein said main conversion file is established with a pre-established mapping table of code conversion, and said extension conversion file records the extension code for said rare word according to said mapping table, so as to distinguish different characters between said source encoding sharing space and same single code point in said target encoding space.

5. The method of claim 4, wherein said extension code uses a hash function having different language features as the input.

6. The method of claim 5, wherein said hash function assigns a unique value for each of a plurality of characters sharing said same code point as extension code.

7. The method of claim 6, said rare words having the identical or similar language feature of pronunciation and sharing same single code point in said target encoding space are assigned with a unique extension code; and said deputy character for said sharing code point is also assigned with an extension code.

8. The method of claim 1, wherein said language features includes pronunciations (pinyin).

9. The method of claim 1 wherein said language features includes radicals and number of strokes.

10. The method of claim 9, wherein said number of strokes also includes stroke order.

11. The method of claim 1, wherein said language feature includes glyphs.

12. A computer program product, the computer program product comprising a non-transitory computer readable storage medium having computer readable program code embodied therewith, said computer readable program code being executable by a computer to:

receive a request for a code conversion from a source file to a target file, wherein a target encoding space comprising Extended Binary Coded Decimal Interchange Code (EBCDIC) associated with the target file is smaller than a source encoding space comprising Unicode associated with the source file;

generate a main conversion file in response to receiving the request;

generate an extension conversion file from said source file according to a pre-established mapping table of code conversion stored in a memory, the pre-established mapping table established with language features that include at least one identical or similar language feature shared by a group of rare words that are provided in the source and target files; and complete said code conversion by using said main conversion file and said extension file such that the target conversion space does not include a truncation of said source file, wherein a rare word is a character in said source encoding space but a corresponding code for said same rare word is not provided in said target encoding space, wherein the completing comprises creating the corresponding code for the rare word by combining a code point of a deputy character in the main conversion file with an extension code of the rare word in the extension conversion file to extend the code of the target encoding space to include the rare word, and wherein the main conversion file and not the extension conversion file is used during execution of a first application program on a processor, and both the main conversion file and the extension file are used during execution of a second application program on the processor.

13. The computer program product of claim 12, wherein the source encoding space and associated file is for a Unicode file, and said target encoding space and associated file is for a EBCDIC file.

14. The computer program product of claim 12, wherein said deputy character has at least one identical or similar language feature with said rare word.

15. The computer program product of claim 14, wherein said main conversion file is established with a pre-established mapping table of code conversion, and said extension conversion file records an extension code for said rare word according to said mapping table, so as to distinguish different characters between said source encoding sharing space and same single code point in said target encoding space.

16. The computer program product of claim 15, wherein said extension code uses a hash function having different language features as the input.

17. The computer program product of claim 16, wherein said hash function assigns a unique value for each of a plurality of characters sharing said same code point as extension code.

18. A system for performing a code conversion having a computer host, comprising:

a bus system;

a memory connected with said bus system, wherein said memory includes a set of stored instructions;

a processing unit connected to said bus system;

said processing unit receiving a request for a code conversion from a source file to a target file, wherein a target encoding space comprising Extended Binary Coded Decimal Interchange Code (EBCDIC) associated with the target file is smaller than a source encoding space comprising Unicode associated with the source file;

said processing unit generating a main conversion file in response to receiving the request;

said processing unit generating an extension conversion file from said source file according to a pre-established mapping table of code conversion stored in said memory and associated with said stored instruction, the pre-established mapping table established with language features that include at least one identical or similar language feature shared by a group of rare words that are provided in the source and target files; and said processing unit completing said code conversion by using said main conversion file and said extension file such that the target conversion space does not include a truncation of said source file;

wherein a rare word is a character in said source encoding space but a corresponding code for said same rare word is not provided in said target encoding space, wherein the completing comprises creating the corresponding code for the rare word by combining a code point of a deputy character in the main conversion file with an extension code of the rare word in the extension conversion file to extend the code of the target encoding space to include the rare word, and wherein the main conversion file and not the extension conversion file is used during execution of a first application program on a processor, and both the main conversion file and the extension file are used during execution of a second application program on the processor.

* * * * *